Sept. 3, 1968  J. R. SARE ET AL  3,400,037
METHOD OF MANUFACTURING CELLULAR PACKING MATERIALS
Filed Nov. 13, 1964  3 Sheets-Sheet 1
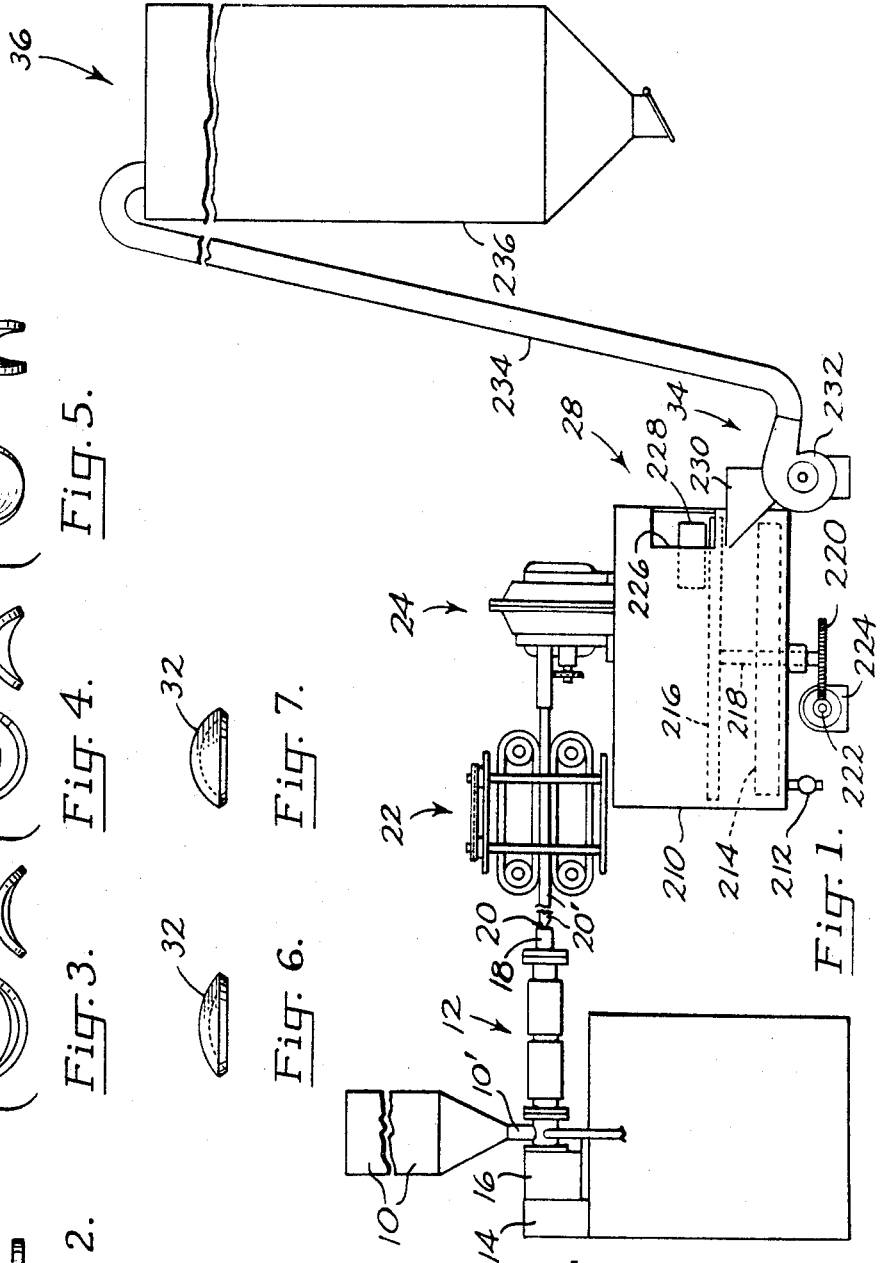
James R. Sare
Richard L. Ropiequet
Duncan G. Bergeron
INVENTORS
BY Oliver D. Olson
Agent

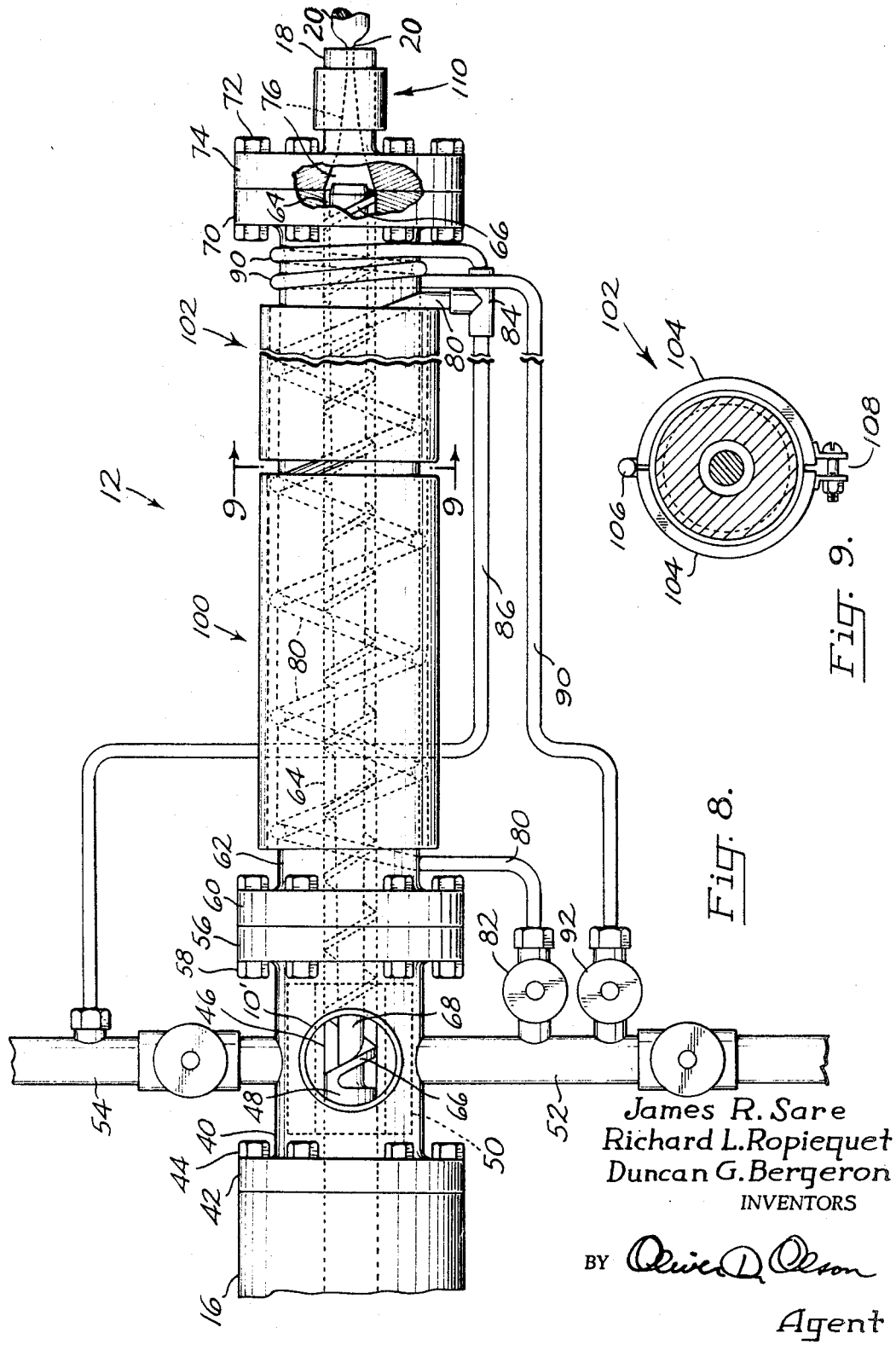

Sept. 3, 1968  J. R. SARE ET AL  3,400,037
METHOD OF MANUFACTURING CELLULAR PACKING MATERIALS
Filed Nov. 13, 1964  3 Sheets-Sheet 3

James R. Sare
Richard L. Ropiequet
Duncan G. Bergeron
INVENTORS

BY *Oliver D. Olson*

Agent

United States Patent Office 3,400,037
Patented Sept. 3, 1968

3,400,037
METHOD OF MANUFACTURING CELLULAR
PACKING MATERIALS
James R. Sare and Richard L. Ropiequet, Portland, and
Duncan G. Bergeron, Beaverton, Oreg., assignors to
Alta Industries, Inc., Beaverton, Oreg., a corporation of
Oregon
Filed Nov. 13, 1964, Ser. No. 411,033
5 Claims. (Cl. 161—42)

This invention relates to articles made of extrudable, expandable synthetic plastic material, and to the method and apparatus for producing such articles.

Extrudable, expandable synthetic plastic materials, such as polystyrene compositions, have been used heretofore in the production of expanded articles of manufacture. Such articles have been produced by extruding foamable synthetic plastic compositions through a die provided with the configuration of the desired external shape of the article. The primary disadvantage in this procedure is represented by the substantial cost involved in the production of such dies.

It is the principal object of the present invention to provide for the production of an article of manufacture the ultimate shape of which is not dependent upon the provision of a correspondingly shaped die.

Another important object of the present invention is the provision of an expanded plastic article of manufacture the ultimate shape of which is produced by the selective warping of a thin, flat wafer of the plastic material.

Another and more specific object of the present invention is the provision of an expanded plastic article of manufacture produced by the selective warping of a thin, flat wafer of the plastic material and having a concavo-convex shape or the shape of a hyperbolic paraboloid.

Still another and specific object of this invention is the provision of an expanded plastic article especially useful as loose-fill packing material, in that a multiplicity of the articles is readily pourable from a bulk supply into a container housing an object to be packed, the shape of the articles contribute to their ability to interlock with each other to prevent shifting of the articles and the object within the package container, and the articles are chracterized by very low bulk density whereby to reduce to a minimum the gross weight of the package and the cost of shipment thereof.

A further important object of the present invention is the provision of a method and apparatus for producing the expanded plastic article of manufacture of this invention.

The foregoing and other objects and advantages of this invention will appear from the following detailed description, taken in connection with the accompanying drawings in which:

FIG. 1 is a foreshortened schematic view in side elevation of apparatus for producing the article of manufacture of the present invention.

FIG. 2 shows plan and side views of a wafer of initially expanded synthetic plastic composition before processing for selective warping to ultimate shape;

Figure 10:
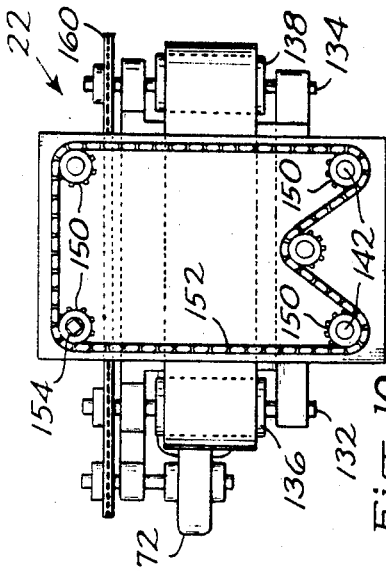
Figure 11:
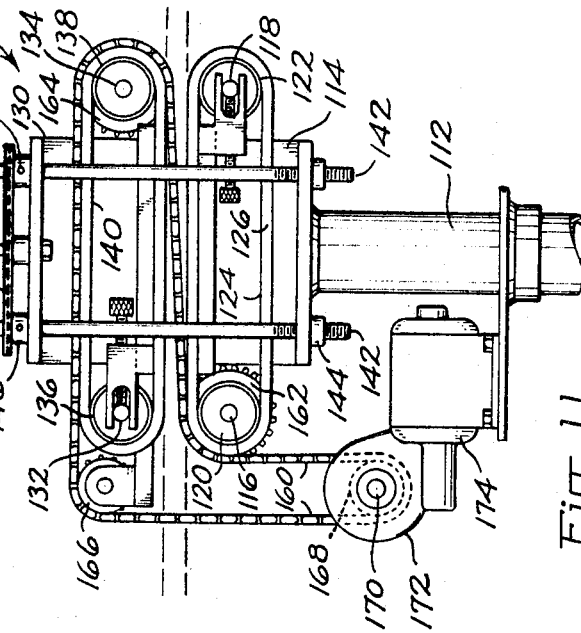
Figure 13:
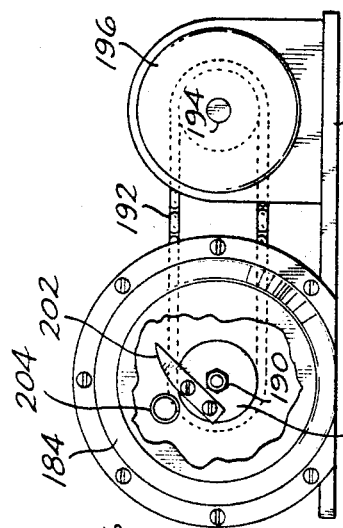
Figure 12:
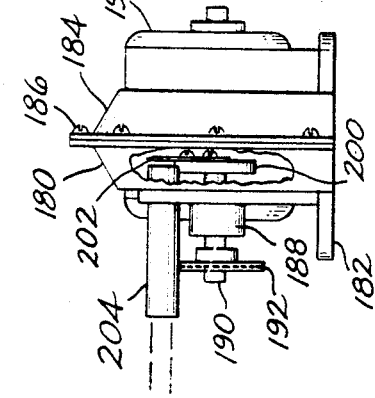

FIGS. 3, 4 and 5 each shows plan, side and end views of articles having varying degrees of hyperbolic paraboloid shapes resulting from the processing of the wafer of FIG. 2 under varying conditions;

FIGS. 6 and 7 are side views of articles having varying degrees of concavo-convex shape resulting from the processing of the wafer of FIG. 2 under still further varying conditions;

FIG. 8 is a foreshortened plan view, partly broken away to disclose details of internal construction, of the extruder component of the apparatus shown in FIG. 1;

FIG. 9 is a sectional view taken along the line 9—9 in FIG. 8;

FIGS. 10 and 11 are plan and side views, respectively, of the puller component of the apparatus shown in FIG. 1; and FIGS. 12 and 13 are side and front views, respectively, with portions broken away to disclose internal details, of the cutter component of the apparatus shown in FIG. 1, FIG. 13 being viewed from the right in FIG. 12.

In its basic concept, the present invention involves the production of an expanded plastic article of manufacture from a thin flat wafer of the plastic material, initially expanded under predetermined conditions and subsequently subjected to an environment of steam, to produce the desired type and degree of warping either to concavo-convex shape or to the shape of a hyperbolic paraboloid.

Referring first to FIG. 1 of the drawings, the apparatus illustrated schematically therein includes a hopper 10 adapted to contain a supply of the extrudable, expandable plastic material, preferably in granular form. There are many types and varieties of such materials well known in the art, representative of which are the compositions disclosed in U.S. Letters Patent Nos. 2,941,964 and 2,941,965.

The constricted, bottom discharge end 10' of the hopper communicates with the infeed end of an extruder component 12 driven by the electric motor 14 through a gear reduction unit 16. The granular raw material is subjected to elevated temperature and pressure as it progresses through the extruder, causing the material to melt. The molten material then is forced through the outlet orifice of the extruder die 18 in a continuous, unexpanded filament 20.

It is an important feature of the present invention, as will become apparent hereinafter, that the outlet orifice of the extruder die need simply be a round hole, rather than a complex configuration which heretofore has been required for predetermining the ultimate exterior shape of the finished article.

As the molten filament extrudes from the outlet orifice of the extruder die, exposure to the atmosphere results in rapid and substantial expansion to a rod 20' many times the diameter of the orifice. This expansion is accompanied by simultaneous cooling of the expanded rod sufficiently to render the rod self-supporting, though quite flexible. Accordingly, the initially expanded rod is fed through a puller component 22 which performs the multiple functions of supporting the flexible rod a distance forwardly of the extruder component, stretching the rod slightly as it conveys the latter away from the extruder die, and feeding the leading end of the rod continuously to the cutter component 24 of the apparatus.

The cutter component functions to cut the initially expanded rod continuously into a multiplicity of thin, flat wafers 26 (FIG. 2). These wafers are fed into the post-expansion component 28 of the apparatus, wherein the wafers are deposited onto a moving conveyor in an atmosphere of steam. As these wafers progress through the post-expansion component to a point of discharge from the latter, the environment of elevated temperature and steam causes the wafers to warp by being expanded further from the condition of initial expansion at the extruder component. Depending in part upon the conditions of extrusion and the thickness of the wafer, as discussed hereinafter, the latter will warp to various degrees either to the hyperbolic paraboloid shapes 30 illustrated in FIGS. 3, 4 and 5, or to the concavo-convex shapes 32 illustrated in FIGS. 6 and 7.

The warped wafers discharge from the post-expansion component and are conveyed by suitable means 34 to storage 36, from whence they are packaged for shipment.

Referring now particularly to FIG. 8 of the drawings, the extruder component 12 of the apparatus includes an infeed housing 40, secured at one flanged end 42, as by the bolts 44, to the output end of the gear reduction unit 16. The infeed housing is provided with a central bore 46 receiving removably therein the infeed end of an extruder screw 48 which projects outwardly from its connection to the gear reduction unit. The bottom discharge end 10' of the hopper communicates with this bore 46 and projects upwardly therefrom through the housing 40. An annular chamber 50 in the housing surrounds the bore 46, except for the area occupied by the discharge end 10' of the housing and this chamber communicates with infeed and drain conduits 52 and 54, respectively, for the circulation of cooling water therethrough. The inlet housing 40 thus is maintained at a temperature sufficiently low to prevent melting of the plastic material in the inlet end of the bore 46 and in the discharge end 10' of the hopper.

The forward flanged end 56 of the inlet housing 40 supports, as by the bolts 58, the rearward flanged end 60 of the elongated extruder housing 62. This housing is provided with an axial bore 64 which is coaxial with and of the same diameter as the bore 46 in the inlet housing, for receiving the extruder screw 48 therein.

In the preferred embodiment illustrated, the extruder screw 48 is provided with a helical rib 66 of constant pitch and diameter projecting from a spindle 68 whose diameter increases uniformly from the infeed end to the outfeed end of the screw. By this construction the plastic composition is compressed progressively as it is fed forward along the bore 64. To the forward flanged end 70 of the extruder housing 62 there is secured, as by the bolts 72, the rearward flanged end 74 of the extruder die 18. This die is provided with a central bore 76, coaxial with the bore 64 in the extruder housing. The die bore tapers forwardly from a diameter substantially the same as the diameter of the bore 64 to a smaller diameter which predetermines the desired diameter of the extruded filament 20 prior to expansion.

Means is provided for controlling the temperature of the plastic material as it progresses forwardly along the bore 64. To this end a cooling conduit 80 is coiled helically about the extruder housing 62, being retained in a helical groove provided in the outer surface of the housing. The rearward end of the conduit is connected through the control valve 82 to the infeed conduit 52. The valve may be of the manual type, but preferably is of the well-known type which is actuated by an electric solenoid. The forward end of the conduit 80 terminates rearwardly of the forward end of the extruder housing 62 and is connected through the T-coupling 84 to the outlet conduit 86 communicating with the drain pipe 54.

A second cooling conduit 90 is coiled helically about the forward end of the extruder housing 62. One end of this conduit is connected through the control valve 92 to the infeed pipe 52, and the opposite end of the conduit is connected through the T-coupling 84 to the outlet conduit 86.

Removably enclosing the cooling coil 80 and the extruder housing 62 is a pair of electrical heater units 100 and 102. Each unit comprises a pair of elongated, semicircular members 104 of electrically non-conducting material each housing therein an electrical resistance heater element. The pair of semi-circular members of each unit are joined together at one of their adjacent edges preferably by such means as the piano hinge 106, to permit the halves to be swung apart so that the unit may be installed upon or removed from the extruder housing. Clamp means 108 is provided adjacent the opposite edges of the semi-circular members of each unit for securing them together releasably.

A third heater unit 110 of similar construction removably encircles the extruder die 18 forwardly of the mounting flange 74.

As will be explained more fully hereinafter, each of the three heater units 100, 102 and 110 is connected to a source of elastic supply through its own adjustable control (not shown), such as a potentiometer, so that each associated zone of the extruder component may be varied in temperature independently of the others.

Referring now to FIGS. 10 and 11 of the drawings, the puller component 22 of the apparatus is shown to include an upstanding pedestal 112 mounting at its upper end the bracket 114 which supports longitudinally spaced shafts 116 and 118. These shafts rotatably mount rollers 120 and 122, respectively, which support an endless belt 124 having a surface layer of sponge rubber 126 or other similarly soft material.

A second bracket 130, supporting a similar assembly of longitudinally spaced shafts 132 and 134, rollers 136 and 138 and endless belt 140, is positioned above the lower belt assembly and supported for vertical adjustment relative thereto by means of the plurality of vertically extended, elongated adjustment screws 142. Each of these screws is threaded through a boss 144 secured to a laterally extending plate on the lower bracket 114, and the upper end of each screw projects freely through a collar 146 secured to a similar lateral plate on the upper bracket 130. A set screw 148 in the collar extends radially inward thereof into an annular groove provided in the screw, whereby to secure the upper bracket 130 to the screw while permitting rotation of the latter. The upwardly projecting end of each screw mounts a sprocket 150 over which the endless chain 152 is trained.

One of the screws 142 is provided at its upper end with a non-circular drive connection 154 for a crank or other appropriate tool by which to rotate the screw. By virtue of the interconnection of all of the screws by the chain 152, simultaneous rotation of all of the screws in the same direction is achieved, thereby moving the upper belt assembly vertically with respect to the lower belt assembly. Thus, the space between the adjacent working stretches of the opposed belts may be adjusted to accommodate varying diameters of initially expended plastic rod material 20' emanating from the extruder component 12.

Means for driving the upper and lower belt assemblies is provided by the endless chain 160 trained over a sprocket 162 on the shaft 116, thence over another sprocket 164 on the upper shaft 134 and an idler sprocket 166 mounted on the upper bracket 130, and thence around a sprocket 168 secured to the output shaft 170 of the gear reduction unit 172 driven by the electric motor 174.

The puller unit 22 functions to grip the initially expanded plastic rod 20' between the soft gripping surfaces of the opposed belt assemblies, and to continuously withdraw the rod from the extruder unit 12. By adjustment of the variable speed drive motor 174, the speed of the belt assemblies may be adjusted to provide a desired degree of pull upon the rod, thus to assist in controlling the diameter of the rod and hence the diameter of the flat, thin wafers 26 cut from it.

The initially expanded rod is fed from the puller component to the cutter unit 24 wherein the rod is cut into a multiplicity of thin flat wafers 26. The cutter unit illustrated in FIGS. 12 and 13 comprises a hollow housing including a fixed section 180 mounted on a base 182 and a removable section 184 secured to the fixed section by such means as the bolts 186. The side wall of the fixed section supports a bearing 188 which mounts a rotary cutter shaft 190. This shaft extends through the fixed housing wall, and the outer end of the shaft mounts a sprocket which is connected through the endless chain 192 to a sprocket mounted on the output shaft 194 of an electric drive motor 196. This motor preferably is of the variable speed type, whereby to control the rotational speed of the shaft and hence the rotational speed of a cutter head mounted on the shaft within the housing.

In the embodiment illustrated, the cutter head comprises a disc 200 removably secured to the cutter shaft 190 and removably mounting a cutter blade 202 for rotation therewith. The cutting edge of the blade is disposed to intercept the path of the initially expanded plastic rod 20' which is fed into the cutter housing through the guide tube 204.

It will be understood that the thickness of the wafers 26 cut from the rod is dependent upon the relative speed of longitudinal movement of the rod into the cutter housing and the rotational speed of the cutter blade. Either or both of these factors may be controlled by appropriate adjustment of speed of the variable drive motors 174 and 196 respectively.

The post expansion unit 28 comprises a hollow closed tank 210 provided with a valved inlet 212 at its bottom for introducing water. Electrical heater means 214 is contained within the tank adjacent the bottom thereof for heating the water to boiling and thus providing an atmosphere of steam within the tank. A perforate plate 216 within the tank and above the level of water therein is supported for rotation with the vertical shaft 218 which extends downward through the bottom of the tank. The lower end of the shaft supports a gear 220 which meshes with a worm 222 on the output shaft of the electric drive motor 224.

An opening 226 is provided in the side of the tank, to permit the discharge of treated wafers from the tank. To this end there is mounted on the side wall within the opening an elongated deflector blade 228 which closely overlies the perforate conveyor plate 216. The blade extends inwardly of the outer edge of the plate 216 to intercept the wafers previously deposited upon a conveyor plate behind the blade 216 and subjected to the atmosphere of steam. The deflector plate thus directs the treated wafers outwardly through the opening 226 for collection and storage.

In the embodiment illustrated in FIG. 1, the treated wafers discharged from the post-expansion unit 28 fall by gravity through a hopper 230 from whence they are blown or otherwise conveyed, by such means as the fan 232, upwardly through the duct 234 into the storage container 236. This container preferably is made of perforate material, such as screen or other open mesh material, to permit the free circulation of air through the finished articles stored therein, to facilitate drying. From the storage container the finished articles may be poured into plastic bags or other containers for shipment.

To illustrate the operation of the apparatus described hereinbefore, the polystyrene composition disclosed in U.S. Letters Patent No. 2,941,964 and marketed by Koppers Company, Inc. under the trademark Dylite, was fed to the extruder unit 12 wherein the extruder screw 48 was approximately 20" long and 1" in diameter, and the outlet orifice of die 18 was 1/8" in diameter. The screw was rotated between 50 and 73 r.p.m., the working stretches of the belts 124 an 140 of the puller unit 22 were moved at a speed of about 30 lineal feet per minute, and the single cutter blade 202 was rotated at about 2,800 r.p.m.

The heater units 100, 102 and 110 and the flow of cooling liquid through the chamber 50 and coils 80, 90 were adjusted to maintain the temperature at the infeed end of the screw at about 100° F., the temperature of the screw in the area of heater element 100 at about 220° F., the temperature of the screw in the area of heater element 102 at about 250° F., and the temperature at the die 18 at about 230° F.

The post-expansion unit 28 provided steam at atmospheric pressure, and the movement of the perforate conveyor provides a treatment time of about 30 seconds.

As the 1/8" diameter filament 20 extruded from the die orifice, it expanded to approximately 3/4" diameter. The cutter unit 24 reduced this rod to a multiplicity of flat, thin wafers about 1/16" thick.

In the illustrated operation of the apparatus described hereinbefore, various factors contribute beneficially or adversely to the characteristics of the resultant article. For example, it has been found that when the extruder screw 48 is rotated at a speed below a predetermined minimum, for example below about 50 r.p.m., the thin, flat wafers 26 produced at the cutter unit 24 do not warp when subjected to the steam treatment in the post-expansion unit 28. On the other hand, when the extruder screw is rotated at a speed in excess of about 73 r.p.m., the post-expansion treatment results in the wafers being warped excessively and exhibiting too high bulk density.

When the extruder screw is rotated at a speed from about 50 to about 69 r.p.m., the post-expansion treatment results in the production of the concavo-convex shapes 32 illustrated in FIGS. 6 and 7. Rotation of the extruder screw from about 69 to about 73 r.p.m. produces the hyperbolic paraboloid shapes 30 of FIGS. 3, 4 and 5 in the post-expansion unit.

Additionally, the degree of expansion and warping in the post-expansion unit varies with the time of exposure of the wafers to the elevated temperature of the steam atmosphere. In the example illustrated, an exposure time of about 30 seconds provided optimum expansion and warping. When the exposure time was reduced to about 20 seconds the degree of warping was not sufficient to provide the shapes illustrated in FIGS. 3 and 6. On the other hand, when the exposure time was extended to about 50 seconds, the degree of warping was excessive, i.e. it produced a degree of curl substantially greater than that illustrated in FIGS. 5 and 7. Moreover, the cellular structure of these wafers collapsed, rendering the product unsuitable as a loose-fill packing material.

It will be understood that the exposure time in the post-expansion unit 28 may be reduced materially by constructing the tank so that it may be pressurized with steam.

Another factor contributing to the ultimate characteristics of the finished article is the degree of heating of the plastic material in the extruder unit 12. For example, it has been found that proper expansion and warping in the post-expansion unit 28 does not occur with the plastic material described hereinbefore, when the temperature of the die 18 is equal to or higher than the temperature in the zone of heating unit 102. Moreover, excessive warping occurs when the temperature in the zone of heating unit 102 exceeds about 265° F.

The finished articles as discharged from the post-expansion unit may be used for various purposes. For example, they may be strung on threads in the manner of popcorn or beads, to provide Christmas tree or other decorations. They may be impaled upon wires to form various ornamental structures. Of particular importance, however, is the use of the articles as a loose-fill packing material for packing fragile objects for shipment. Thus, whereas popcorn, excelsior and other well known material have been used, for example, in packing of delicate and expensive glassware, the articles of manufacture of the present invention provide advantages not attainable by these other materials.

For example, the warped shapes 30 and 32 illustrated in FIGS. 3–7 have much lower bulky density, are chemically inert, and are much less expensive than popcorn. They flow freely, in the manner of grain, to completely fill a container and surround an object contained therein, thus eliminating the tedious and time consuming procedure of hand packing required in the use of excelsior and other stringy materials, while simultaneously achieving a substantially uniform bulk density throughout the packing.

Further, the warped shapes of the articles illustrated herein tend greatly to interlock with each other when massed together. In the case of the dome shaped structures 32 of FIGS. 6 and 7, the concave surface of one tends to lock the convex surface of another with it, and the firmness of the lock is enhanced by the highly frictional character of the surfaces of the expanded material.

In the case of the hyperbolic paraboloid shapes 30 of FIGS. 3, 4 and 5, it is to be noted, with particular reference to the side and end views, that these shapes provide a pair of saddles disposed substantially normal to each other (one defined by the top surface and the other by the bottom surface). Accordingly, one saddle of one article tends to seat in one saddle of another article and to be locked in such position by the frictional contact between the abutting surfaces.

Although the shapes described hereinbefore have been produced by the extrusion of the expandable plastic material through a simple round orifice die, it will be apparent that non-circular die orifices may be employed if it is desired to produce the intermediate flat, thin wafers 26 of non-circular shape for post-expansion treatment in the manner described hereinbefore. In any event, the finished article is characterized by having curvilinear top and bottom surfaces and a cross sectional thickness substantially less than its peripheral dimensions.

Other foamable synthetic plastic compositions well known in the art may be employed for the purpose of the present invention, it being recognized that in such event the temperature conditions previously illustrated may require modification in accordance with the physical properties of the particular composition.

The foregoing and other modifications in structure and process conditions may be made without departing from the spirit of this invention and the scope of the appended claims.

Having now described our invention and the manner in which it may be used, what we claim as new and desire to secure by Letters Patent is:

1. The method of making an article of extrudable, expandable synthetic plastic material, comprising:
    (a) extruding the material under pressure through a die orifice to an atmosphere of lower pressure to initially expand the extruded filament to rod form of larger cross sectional dimension,
    (b) cutting the expanded rod form transversely into a multiplicity of flat, thin wafers each having a cross sectional thickness substantially less than its peripheral dimensions, and
    (c) subjecting the wafers to the action of steam at elevated temperature for a time sufficient to effect warping of the wafers to a shape having curvilinear top and bottom surfaces and a cross sectional thickness substantially less than their peripheral dimensions.

2. The method of claim 1 wherein the material is extruded through a circular die orifice to produce an initially expanded cylindrical rod.

3. An article of manufacture comprising an expanded synthetic plastic material having a curvilinear top and bottom surfaces and a cross sectional thickness substantially less than its peripheral dimensions.

4. An article of manufacture comprising an expanded synthetic plastic material having a concavo-convex shape and a cross sectional thickness substantially less than its peripheral dimensions.

5. An article of manufacture comrising an expanded synthetic plastic material having a hyperbolic paraboloid shape and a cross sectional thickness substantially less than its peripheral dimensions.

References Cited
UNITED STATES PATENTS 3,033,806  5/1962  Spencer _____ 264—53
3,066,382  12/1962  Zweigle et al. _____ 264—51

JAMES A. SEIDLECK, *Primary Examiner.*

L. GARRETT, *Assistant Examiner.*